United States Patent Office 3,652,510
Patented Mar. 28, 1972

3,652,510
POLY(1,4-BENZAMIDE) PARTICLES AND THE PREPARATION THEREOF
Richard N. Blomberg, Wilmington, Del., assignor to E. I. du Pont de Nemours and Company, Wilmington, Del.
No Drawing. Continuation of abandoned application Ser. No. 747,126, July 24, 1968. This application Mar. 17, 1971, Ser. No. 125,354
Int. Cl. C08g 20/04
U.S. Cl. 260—78 A          9 Claims

ABSTRACT OF THE DISCLOSURE

Shaped acicular particles of poly(1,4-benzamide) of specified characteristics are precipitated from a composition comprising the polymer, an amide or urea medium and lithium chloride, using specified non-solvents. Articles of manufacture including textile denier fibers, that are comprised of these particles exhibit excellent tensile properties.

This application is a continuation of application Ser. No. 747,126, filed July 24, 1968, now abandoned.

SPECIFICATION

This invention relates to fibrous particles of poly(1,4-benzamide) and a process for their preparation.

SUMMARY OF THE INVENTION

The fibrous particles are composed of poly(1,4-benzamide) characterized by recurring units of the formula:

(I) 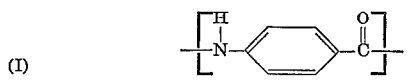

having an inherent viscosity of between 0.8 and 1.8, measured as described hereinafter. The particles exhibit lengths (the largest dimension) up to 5000 microns and widths (the next largest dimension) of up to 4 microns, with the further proviso that the L/W ratio is greater than 2/1. The orientation angle ($2\theta_p$) of the particles, determined as described hereinafter, is less than about 45°. The angular variation ($2\alpha$) for minimum transmittance of polarized light, determined as described hereinafter, is in the range between 5° and 20°.

The particles, having the aforesaid properties, are prepared by the process of this invention by the preciptation of poly(1,4-benzamide) under specified conditions. The process comprising preparing a composition containing from about 3 to 6 weight percent of poly(1,4-benzamide) (based on the total weight of the composition), in an amide or urea medium, such as N,N,N',N'-tetramethylurea (TMU) or N,N-dimethylacetamide (DMAc) containing between about 1 and 8 moles of lithium chloride for each mole of polymer. Optionally, the composition may also contain from about 2 to 16 moles of N,N-dimethylformamide (DMF) for each mole of polymer. A non-solvent for the polymer having a dielectric constant less than about 15 at 20° C. which is miscible in the amide or urea medium, such as carbon tetrachloride, chloroform or benzene, is added under conditions designed to precipitate the particles, preferably as discrete entities.

Although essentially homopolymeric poly(1,4 - benzamide) is preferred for use herein, the term "poly(1,4-benzamide)" is used herein to include polymer which may contain up to about 10% of other recurring units (in addition to those of Formula I). Recurring units of the formula (II) 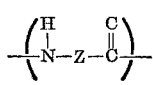

wherein Z represents a divalent organic radical, preferably a m-phenylene radical or a member of the group consisting of m-phenylene and p-phenylene radicals which bear one or more substituents (the same or different) selected from the group of halogen, lower alkyl, lower alkoxy, isopropenyl, methylthio, ethylthio, cyano, nitro acetyl, carbomethoxy, carboethoxy, acetamido, dimethylamino, diethylamino, ethylsulfonyl, dimethylcarbamoyl, diethylcarbamoyl, methylsulfonyl, dimethylsulfamoyl, diethylsulfamoyl, and fluorosulfonyl radicals, or a structure of the type

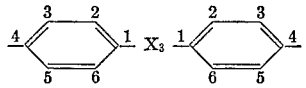

which may bear one or more substituents selected from the group of halogen, lower alkyl, and lower alkoxy radicals and where the terminal bonds are attached to 3, 4 or 5 positions and wherein $X_3$ is a single bond,

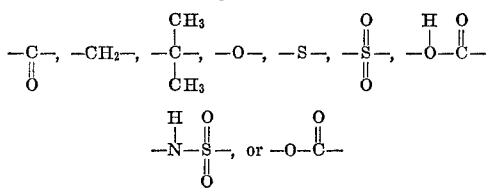

are suitable.
Recurring units of the formulae:

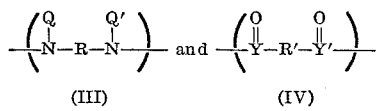

wherein R and R' may represent the same or different divalent organic radicals, preferably as defined for Z above; in addition, R may represent a single bond; Q and Q' are selected from the group of a hydrogen atom and methyl and phenyl radicals; Y and Y' are selected from the group of

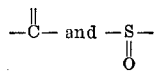

are also suitable. The Formulae III and IV units are present in substantially equimolar amounts constituting up to about 5 mole percent each. A preferred copolyamide is comprised of about 90 mole percent of poly-1,4-benzamide) recurring units and up to about 10 mole percent of poly(1,4-phenylene terephthalamide) recurring units.

DETAILED DESCRIPTION OF THE INVENTION.— PREPARATION OF POLY(1,4-BENZAMIDE)

Poly(1,4-benzamide) is conveniently prepared from a suitable monomer, such as the amine hydrochloride of p-aminobenzoyl chloride. The monomer exhibits the following structural formula:

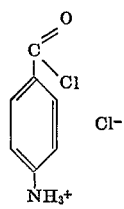

The monomer, together with comonomers, if any, is preferably polymerized in solution, using TMU or DMAc as the solvent. Rapid stirring for about two hours at ambient temperature is sufficient to attain substantially complete polymerization. The molecular weight is controlled by the addition of up to about 2 mole percent, based on monomer, of a chain-stopping agent, such as p-aminobenzoic acid, which is added during the early stages of polymerization. The chain-stopping agent prevents or minimizes the formation of high molecular weight polymer (i.e., $\eta_{inh}>$ about 1.8) which would make it difficult to obtain proper mixing during the subsequent precipitation. The amount of chain-stopping agent which is used will vary with the degree of monomer purity.

The acidic by-product of the polymerization reaction, hydrogen chloride, is preferably neutralized, preferably by using two equivalents of a neutralization agent, such as an alkali metal salt, for each mole of polymer. Lithium carbonate is preferred for this purpose because it reacts with the hydrogen chloride to form lithium chloride, which together with the TMU or DMAc prevents gelation of the polymer.

If the polymerization reaction mixture contains impurities or sufficient low molecular weight material to interfere with the precipitation of well-formed, discrete solid particles, it is desirable to isolate the polymer in bulk form by precipitating it in water under high shear such as that obtained in a blender operated at high speed, and washing the finely divided product with both water and alcohol, after which the product is dried overnight in a vacuum oven at about 80 to 90° C. Isolation is not otherwise necessary, as further described hereinafter.

Poly(1,4 - benzamide) having an inherent viscosity ($\eta_{inh}$) between about 0.8 and 1.8 is suitable for formation of the particles of this invention. Polymer in this range will precipitate in the desired particle form under the conditions described hereinafter. If gel phase chromatography indicates that the poly(1,4-benzamide) contains an appreciable low molecular weight fraction ($\eta_{inh}<0.8$), precipitation of this fraction in the form of an oil or semi-solid after the higher molecular weight material has precipitated may result. This material agglomerates the previously formed solid particles, making it difficult to isolate them as discrete entities. When employed in the preferred concentration range, polymer compositions having an $\eta_{inh}$ above about 1.8 are too viscous to permit the uniform distribution of non-solvent required to avoid localized precipitation of polymer in the form of highly branched, i.e., dendritic, particles that do not exhibit the unique structure or properties which characterize the particles of this invention.

The essentially homopolymeric poly(1,4-benzamide) useful in this invention possesses a peak height ratio of below 0.86 and, moreover, no sediment of polymer is seen when the polymer is subjected to the solubility test, all measured as described hereinafter. It will be understood, however, that the peak height ratio as measured on polymer that has been heated at elevated temperatures, and/or spun, may exceed 0.86. Solubility properties may also change on heating or spinning.

POLY(1,4-BENZAMIDE) COMPOSITION

The particles of this invention are precipitated from a composition comprising 3 to 6% by weight of poly(1,4-benzamide) (based on the total weight of the composition) in an amide or urea medium such as TMU or DMAc containing between about 1 and 8 moles of lithium chloride for each mole of polymer. This composition may be produced by polymerizing the amine hydrochloride of p-aminobenzoyl chloride in TMU or DMAc and neutralizing the hydrogen chloride produced with lithium carbonate, as previously described. Following the removal of water resulting from the neutralization reaction, poly (1,4-benzamide) particles of the desired dimensions can be precipitated directly from the polymerization reaction mixture, providing that the precipitation is stopped before any substantial amount of low molecular weight oil or semi-solid material which may be present precipitates. The reaction mixture is combined with quantities of the salt and the amide or urea medium required to place it within the limits previously specified. If isolation is necessary or desirable (as previously described) the isolated poly(1,4-benzamide) may be added to the amide of urea medium containing lithium chloride.

Among the suitable amide or urea media, TMU or DMAc are most preferred. Other amide media, such as N,N-dimethylpropionamide and N,N-dimethyl-butyramide are suitable. Mixtures of urea and/or amide media, such as TMU and DMAc are suitable. A sufficient quantity of the amide or urea medium must be employed to result in the presence of about 3 to 6% by weight of polymer based on the total weight of the polymer, amide and salt composition, optionally between about 2 and 16 moles of N,N-dimethylformamide (DMF) per mole of polymer. The use of DMF is preferred in that using constant shear rates it has been observed that the average length of the precipitated particles is directly proportional to the DMF concentration. To avoid the previously described difficulties associated with the precipitation of polymer as an oil or semi-solid, no more than 8 moles of DMF per mole of polymer should be employed when the latter contains an appreciable fraction having an $\eta_{inh}$ less than 0.8 as indicated by gel-phase chromatography.

The polymer should comprise about 3 to 6% by weight based on the total weight of the polymer-amide or urea medium-salt composition. If less than 3% by weight is used, the particles may be so small and/or agglomerated as to make them unsuitable for the end use applications described hereinafter. In addition, the large amount of non-solvent required to precipitate the polymer may also precipitate a substantial quantity of lithium chloride prior to or concurrently with the first portion of polymer, resulting in a non-uniform batch of particles.

If more than 6% by weight is used, it may be difficult to avoid the localized precipitation described hereinbefore. If it is desired to reduce the viscosity of a given composition, additional lithium chloride as well as amide or urea may be required. An initial polymer concentration of between 5 and 6% by weight prior to addition of non-solvent is preferable when the inherent viscosity of the polymer is between 1.0–1.2. The viscosity of compositions containing these polymers permits good mixing action at relatively low shear levels, thereby avoiding breakage of particles. High molecular weight polymer ($\eta_{inh}>1.2$) would require a lower initial solids concentration to achieve optimum viscosity. Polymer gel is undesirable because its presence makes it difficult to obtain a homogeneous system.

The presence of about 1 to 8 moles of lithium chloride per mole of polymer in the composition is important. The preferred amount of this salt varies both with the amide or urea medium and the non-solvent used. The amount of lithium chloride necessary to obtain well-formed discrete particles using TMU with various non-solvents is summarized in the following table.

| Non-solvent: | Moles of lithium chloride/ mole of polymer |
|---|---|
| Carbon tetrachloride | [1] 2.0–4.0 |
| Benzene | 2.0–2.5 |
| Chloroform | 3.0–8.0 |

[1] Preferably 3.0–5.0.

Using DMAc as a solvent, the following ranges of lithium chloride concentration are required.

| Non-solvent: | Moles of lithium chloride/ mole of polymer |
|---|---|
| Carbon tetrachloride | [1] 2.0–4.0 |
| Benzene | 1.5–4.0 |
| Chloroform | [2] 4.0–8.0 |

[1] Preferably 3.0–4.0.
[2] Preferably 4.0–5.0.

PRECIPITATION OF THE PARTICLE

The particles of this invention are precipitated from the previously described poly(1,4-benzamide)-urea or amide medium-salt composition by the addition of a non-solvent while stirring the composition.

The non-solvent for the poly(1,4-benzamide) must be miscible with the liquid medium (e.g., DMAc or TMU) and have a dielectric constant ($\epsilon$) less than about 15 at 20° C. Among the preferred precipitants are carbon tetrachloride ($\epsilon=2.23$), benzene ($\epsilon=2.28$), and chloroform ($\epsilon=4.80$). These non-solvents do not rapidly precipitate the polymer (e.g., about 10 to 15% by volume must be added to a composition containing 5% by weight polymer before any polymer precipitates). Non-solvents, such as water ($\epsilon=80.37$) which rapidly precipitates the polymer, do not provide particles of this invention. The amount of non-solvent added is not critical so long as it is sufficient to precipitate substantially all of the polymer suitable for particle formation while either retaining the undesirable low molecular weight fraction ($\eta_{inh}<0.8$) described hereinbefore in solubilized form or allowing this fraction to precipitate in a form which will not interfere with isolation of the already formed particles. It is preferred to initially add a quantity of the non-solvent which is insufficient to precipitate the polymer. Additional non-solvent is then gradually added at a rate of between 0.1 and 10 g./hr. per gram of polymer present, during which time the polymer precipitates. It may be necessary to seed the mixture or scratch the flask wall to avoid supersaturation, which would result in rapid precipitation of dendritic particles.

The mixture is preferably stirred at a rate which will evenly distribute the non-solvent yet which is not so rapid as to cause excessive fragmentation of the particles. The size of the particles decreases as the rate of shear increases. Although small size particle size is desirable for many purposes, excessive fragmentation (from excessive rates shear) is undesirable and should be avoidable if such rate results in an $L/W$ less than 2/1.

At the completion of precipitation, an excess of non-solvent is added, equal to between 0.5 and 1 times the initial volume of liquid and the particles are isolated by filtration and washed. Anhydrous ethyl alcohol is preferably employed as the initial wash, followed by ethyl alcohol containing progressively increasing percentages of water, and finally with boiling water to remove the last trace of organic liquids and lithium chloride. When a precipitation using carbon tetrachloride as the non-solvent is not carried to completion in order to avoid the precipitation of low molecular weight polymer, the initial wash should comprise about a 6.6/3.3/0.1 weight ratio mixture of carbon tetrachloride/amide or urea/lithium chloride. This treatment will retain in solution only the low molecular weight material which otherwise would precipitate onto the surface of the particles, causing them to adhere to one another.

HEAT TREATMENT OF THE PARTICLES

When the particles are heated at temperatures between about 450 and 550° C. for up to six minutes, the electron diffraction pattern indicates a high degree of three-dimensional crystallinity. Prior to such heat treatment, the electron diffraction pattern generally indicates a high degree of order in only one direction, which birefringence measurements indicate to be parallel with respect to the longitudinal axis of the particle.

STRUCTURE OF THE PARTICLES

Electron diffraction patterns indicate an orientation angle ($2\theta_p$) of less than about 45° for the particles. This represents the angular distance between half maximum intensity points of an equitorial reflection, which appears as an arc on the electron diffraction pattern. The physical significance of the orientation angle value is that approximately 77% of the crystallites are aligned within this angle about the longitudinal axis.

In the particles of this invention, the angle (measured with respect to the longitudinal particle axis) at which minimum transmittance of polarized light occurs is not constant throughout the particle, but rather varies over a range ($2\alpha$) of between 5° and 20°. The physical significance of this varying angle is that it indicates the existence of discrete bodies within the particles which may be distinguishable under the optical microscope only as regions exhibiting varying degrees of brightness. The regions exhibit a dimension (measured with respect to the longitudinal particle axis) that is equal to or less than the width (i.e., the second largest dimension) of the particle.

The structure of the poly(1,4-benzamide) particles of this invention differs significantly from other shaped articles of poly(1,4-benzamide). For example, a fiber formed by extruding a poly(1,4-benzamide)-TMU-LiCl dope exhibits a value for $2\alpha$ of less than about 2°. In contradistinction to the particles of this invention, substantially no regions exhibiting varying degrees of brightness are seen, which indicates that the fiber is not comprised of "discrete bodies."

UTILITY OF THE PARTICLES

The particles of this invention have a wide range of uses. Particles up to 10 microns in length are useful as reinforcing agents for textile denier filaments. Melts or solutions of fiber-forming, synthetic organic matrix polymer containing up to 25% (preferably up to 10%) by weight of these particles (based on the total polymer concentration) are readily processed into fibers that exhibit levels of initial modulus and resistance to growth and creep that are markedly higher than unreinforced control fibers. Smaller particle lengths are preferred, since they furnish a high surface to volume ratio and allow the matrix polymer to be more highly drawn.

The particles of this invention are also useful when incorporated into larger shaped articles (e.g., rods, sheets, or panels) either as a reinforcing material, or as the basic element of which the article is comprised. Particles having lengths between 10 and 5000 microns are preferred in many of these uses. A particularly preferred use involves the compression molding of articles consisting essentially of these particles. Such articles exhibit significantly higher tensile particles when compared to articles similarly prepared using fibrids or powders of the same polymer.

MEASUREMENTS AND TESTS

Optical path difference (O.P.D.) and angular variation ($2\alpha$)

The optical path difference (O.P.D.) of light vibrating parallel and perpendicular to the longitudinal particle axis is measured using white light and a polarizing microscope equipped with a three order Berek compensator. The sample is mounted in an oil exhibiting a refractive index of 1.63.

The angle between the analyzer (or polarizer) and the longitudinal axis of the particle at which minimum light transmittance occurs is observed at various areas throughout the particles. The number of degrees over which minimum transmittance occurs for a given particle is reported as the angular variation ($2\alpha$).

Particle dimensions

Particle dimensions greater than about 0.2 microns are measured using an optical microscope. The thickness of a given particle ($T_p$), in microns, is calculated using Equation 1.

(1) $$T_p = O.P.D./\Delta_p$$

O.P.D. = optical path difference in microns
$\Delta_p$ = birefringence of particle The O.P.D. is measured as previously described. The birefringence ($\Delta_p$) of the particle is in turn calculated using Herman's equation (Equation 2).

(2) $$\Delta_p = \Delta_t(1 - 3/2 \sin^2 \theta_p)$$

$\Delta_t$ = birefringence of a perfectly ordered polymer sample
$\theta_p$ = orientation angle of the particle divided by 2

Angle $2\theta_p$ is obtained, as described hereinafter, from the electron diffraction pattern of the particle.

Theoretical birefringence ($\Delta_t$) of a perfectly ordered polymer sample is obtained using the following equation (Equation 3), (3) $$\Delta_t = \Delta_f (1 - 3/2 \sin^2 \theta_f)$$

wherein $\Delta_f$ and $\theta_f$ represent the birefringence (measured using an interference microscope), and one-half the orientation angle (measured using X-ray diffraction) respectively, of a crystallized filament prepared from poly(1,4-benzamide). The filament is crystallized by heating it at about 540° C. for up to about 6 seconds. The polymer is prepared as described in the preceding specification.

Inherent viscosity

Inherent viscosity ($\eta_{inh}$) is defined by the following equation:

$$\eta_{inh} = \ln (\eta_{rel}) C$$

wherein ($\eta_{rel}$) represents the relative viscosity and (C) represents a concentration of 0.5 gram of polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C) above; flow times are determined at 30° C., using concentrated (95–98%) sulfuric acid as a solvent (unless otherwise indicated).

Peak height ratio

A measure of the relative intensity of the two major equatorial diffraction peaks is given by the peak height ratio (PHR). A suitable method for determining the PHR involves the use of a reflection technique to record the intensity trace of the X-ray diffraction pattern with an X-ray diffractomer. Approximately 0.5 gram of water- and amide- or urea-free polymer is pressed into a sample holder under an applied pressure of 3,125 lb./in.$^2$ (219.8 × 10$^3$ g./cm.$^2$). Using CuKα radiation, a trace of the intensity is recorded from 6° to 40°, 2θ, and with 0.5° slits, at a scanning speed of 1°, 2θ per minute, a chart speed of 1 inch (2.54 cm.) per minute, and a time constant of 2; 2θ, being the angle between the undiffracted beam and the diffracted beam. The full scale deflection of the recorder is set so that the peak with maximum intensity is at least 50% of the scale, which is a linear scale. To calculate the PHR, a base line is first established on the diffractometer scan by drawing a straight line between the points on the curve at 8° and 28°, 2θ. Vertical lines (at constant 2θ values) are drawn from the peaks in the vicinity of 20.3° and 23.4°, 2θ, to the base line, and the height of the peaks, in chart divisions, above the base line is ascertained. The PHR is then calculated from the equation $$PHR = A/B$$

where A=height of the peak, approximately located at 20.3°, 2θ, above the base line in chart divisions, B=height of the peak, approximately located at 23.4°, 2θ, above the base line in chart divisions.

Orientation angle

The orientation angle ($2\theta_p$) of the particle is reported as the angle between half maximum intensity points on the equatorial reflection of the electron diffraction pattern. All values listed represent the average obtained using four particles.

Solutility test

To a solution of 1.0 g. of dry lithium chloride in 30 ml. of dry N,N-dimethylacetamide is added 0.5 g. of dry poly(1,4-benzamide) powder comminuted to a particle size of about 1 to 5μ. The tube is stoppered and its contents, heated at 60–80° C., are subjected to stirring by a mechanical agitator for a period of from 10 min. to 4–5 hrs. If polymer particles remain visible, the contents of the tube are cooled to −70° C. (e.g., by immersion in a bath of solid carbon dioxide and acetone), then are allowed to warm up until stirring can be resumed, and are heated as above. The tube is then allowed to stand upright for a further 24 hours without stirring. After this time, no polymer residue lies steeled on the bottom of the tube.

Creep and growth

"Creep" and "growth" are determined by placing a loop of 800 denier yarn in a chamber at 160° C. under dry conditions (substantially 0% relative humidity). The circumference of the loop is 20 inches (50 cm.) at ambient temperature and humidity. The length of the loop is then measured under a load of 0.01 g./denier (equivalent to 16 g.) which is sufficient to convert it to substantially a one-dimensional structure. With one end of the structure secured, a 1600-gram load is attached to the lower end of the loop and the yarn allowed to elongate. The amount of elongation is measured 30 seconds after loading and the measurement is repeated 29.5 minutes later. "Growth" is defined as the relative amount by which the loop elongated during the total 30 minutes, the elongation during the 29.5 minute period is referred to as "creep."

EXAMPLES

The invention is further illustrated in the following nonlimiting examples. Parts and percentages are by weight unless otherwise indicated.

EXAMPLE I

This example illustrates the preparation of the poly(1,4-benzamide) particles of this invention.

Poly(1,4-benzamide) is prepared by combining 192 parts by weight of p-aminobenzoyl chloride hydrochloride and 1000 parts of TMU. The mixture is stirred and cooled at 5° C. to dissolve the monomer and subsequently stirred at 25° C. for between 2–20 hours. A chain terminator, (water, p-aminobenzoic acid or acetylchloride) is used as indicated in Table I.

Upon completition of polymerization the hydrogen chloride generated is neutralized using lithium carbonate. Solid lithium chloride is added to bring the total concentration of salt to between 2 and 8 moles for each mole of polymer. The polymer has a peak height ratio of below 0.86.

TMU and DMF are then added to achieve the desired polymer and salt concentration.

Between about 30 and 40% by weight of carbon tetrachloride (CCl$_4$) based on total weight of the mixture is rapidly added and the inner wall of the flask is scratched as required to initiate crystallization and prevent supersaturation. Using a two-liter resin flask and a single-flight helical stirrer rotating at a speed of between 10 and 150 revolutions per minute for each liter of material, CCl$_4$ vapor is circulated above the surface of the liquid. The temperature of the mixture is maintained sufficiently low to ensure a continuous absorption of CCl$_4$ until substantially all of the polymer is precipitated. Upon completion of precipitation, a second portion of CCl$_4$ equal in volume to the first is rapidly added, after which the particles are isolated by filtration and washed successively with anhydrous ethyl alcohol, an ethyl alcohol-water mixture and one final boiling water wash.

Table I summarizes the quantities of reagents employed to prepare particles, average orientation of particles ($2\theta_p$) and values obtained for 2α. T$_p$, L, and W represent the thickness, length, and width, respectively, of representative particles and are expressed in microns (1 × 10$^{-4}$ cm.). The molar ratio of DMF:lithium chloride:polymer is 4:4:1 in all instances. The amount of TMU present is sufficient to obtain the reported polymer concentration, based upon the total weight of the solution mixture comprising TMU, DMF, lithium chloride, and polymer.

TABLE I

| Chain terminator | $\eta_{inh.}$ | Wt. percent polymer | $2\theta_p$ | $2\alpha$ | $T_p/L/W$ |
|---|---|---|---|---|---|
| Water | 0.99 | 5.1 | 29° | 10° | 3/12/3 |
| Acetyl chloride | ~1.0 | 5.0 | 23° | 8° | 3/70/4 |
| p-Aminobenzoic acid | 1.2 | 5.0 | 26° | 12° | 1/5/1 |
| Do | 1.19 | 5.0 | 41° | 8° | 1/9/1 |

EXAMPLE II

This example illustrates the use of the poly(1,4-benzamide) particles as reinforcing agents in textile denier filaments.

A uniform mixture is prepared by combining 36 g. of powdered poly(hexamethylene adipamide) and 4 g. of poly(1,4-benzamide) particles with 750 cc. of water. The particles are prepared as in Example I, exhibit an average length and width of 5 and 1 microns, respectively, an orientation angle ($2\theta_p$) less than 45° and an angular variation $2\alpha$ between 5° and 20°.

The poly(hexamethylene adipamide) is fiber-forming and extrudable; a solution comprising 0.5 g. of polymer per 100 cc. of a 90% by weight aqueous solution of formic acid exhibits an inherent viscosity of 0.9 at 30° C. calculated as defined in the preceding specification. The polymer-water mixture is dried in a vacuum oven at 100° C. and then molded into a 0.875 inch (2.2 cm.)-diameter plug (A).

A second plug (B) of equal diameter is prepared using poly(hexamethylene adipamide) without the poly(1,4-B) particles and is employed as a control. Plug A is melted, filtered through a 28–49 mesh tabular alumina pack and extruded through a 0.01 inch (0.03 cm.)-diameter orifice. The spinneret temperature and spinning pressure are 294° C. and 2640 p.s.i.g. ($186 \times 10^3$ g./cm.$^2$), respectively. The fiber is wound up at a speed of 23 ft. (6.9 meters) per minute. Plug B is melted, filtered through a 28–40 mesh sand pack and extruded through a 0.01 inch (0.03 cm.)-diameter orifice. The spinneret temperature and spinning pressure are 270° C. and 8000 p.s.i.g. ($560 \times 10^3$ g./cm.$^2$), respectively. The fiber is wound up at a speed of 227 ft. (68 meters) per minute. The reinforced and control fibers are drawn 5× over a hot plate at about 205° C. prior to being wound up. The reinforced fiber exhibits a growth and creep of 2.04% and 0.27%, respectively; the values for the control fiber are 7.7% and 0.9%, respectively.

EXAMPLE III

This example illustrates the preparation of molded polyamide articles reinforced with the poly(1,4-benzamide) particles of this invention and compares the tensile properties of these articles with those exhibited by an unreinforced control.

Poly(1,4-benzamide) particles are prepared following the procedure of Example I using polymer that exhibits an inherent viscosity of 1.05. These particles have L, W L/W, $2\theta_p$ and $2\alpha$ values characteristic of this invention. Fifteen grams of these particles are blended with 50 grams of a powdered terpolymer comprising a 34:23:43 weight ratio mixture of repeating units derived from poly(hexamethylene adipamide), poly(hexamethylene sebacamide) and poly($\epsilon$-caprolactam), respectively. The resulting mixture is injection molded at a temperature of 230° C. and 1400 p.s.i. (98 kg./cm.$^2$) pressure using a 1 minute cycle and a die temperature of 30° C. to form test bars approximately 0.13 inch (0.33 cm.) thick x 0.39 inch (0.99 cm.) wide x 5 inches (12.5 cm.) long. Bars (prepared as a control) are molded using the same terpolymer resin molding conditions, but omitting the poly(1,4-benzamide) particles.

All test bars are dried at 100° C. under reduced pressure for 48 hours prior to testing. The tensile properties of these specimens are determined as described in ASTM method #D-638-64 T with a 0.2 inch (0.5 cm.)/min. cross-head speed. The properties of these specimens are as follows:

| Material | Particle loading (vol. percent) | Tensile strength (p.s.i.) | Elong. (percent) | Tensile modulus of elasticity (p.s.i.) |
|---|---|---|---|---|
| Reinforced article | 20 | a 8,860 | 1.5 | b 595,000 |
| Control | 0 | c 7,400 | 300 | d 130,000 | a 624 kg./cm.$^2$.   b 41,700 kg./cm.$^2$.   c 520 kg./cm.$^2$.   d 9,100 kg./cm.$^2$

EXAMPLE IV

This example illustrates the preparation of self-supporting shaped articles consisting essentially of poly(1,4-benzamide) particles of this invention and compares the tensile properties thereof to articles prepared from other particles.

The poly(1,4-benzamide) particles (A) of this invention are prepared as described in Example I and exhibit an inherent viscosity of 1.5 measured as described hereinbefore. A second type of particle (B) is prepared by gradually adding a solution comprising 5 g. of the polymer per 100 cc. of a 95:5 weight ratio mixture of TMU: lithium chloride as a fine stream to a large excess of water with rapid stirring. The resultant granular precipitate (B) is filtered off, washed with hot water and dried at 100° C. under reduced pressure. A third type of particle (C) is prepared by injecting 100 cc. of a 5% solution of the polymer in TMU/DMF/LiCl (90/5/5% by weight, respectively) into approximately 1 liter of a 0.1% by weight aqueous solution of the sodium salt of lauryl alcohol sulfate which is contained in a colloid mill that exhibits a clearance of 0.002 inch (0.005 cm.) between stator and rotor. This mixture is passed repeatedly through the colloid mill for approximately 15 minutes and the resulting solid product is filtered off, washed with water and dried at 100° C. under reduced pressure. Only particles (A) satisfy all of the parameters, L, W, $L/W$, $2\theta_p$, and $2\alpha$ of this invention.

Samples of A, B, and C are extracted with distilled water in a Soxhlet apparatus for 12 hours after which they are dried at 100° C. under reduced pressure for two hours. Three bars are prepared using particles A, B, and C, respectively, by evenly distributing each of the samples in a graphite mold with a cavity measuring 2 inches (5 cm.) long and 0.25 inch (0.65 cm.) wide. A plunger having substantially the same dimensions as the cavity is inserted into it and subjected to a pressure of 1000 p.s.i. (70.3 kg./cm.$^2$) in a direction normal to the face of the plunger. The mold is heated in an induction furnace for about 15 minutes during which time the temperature rises to 500°±25° C. while blanketed with argon. The pressure is increased to 2000 p.s.i. (140.6 kg./cm.$^2$) after heating about 5 minutes. The induction furnace is turned off and allowed to cool to room temperature while maintaining pressure on the mold.

The resultant specimens are tested in three point flexure with a span length of 1–1.5 inches (2.5–3.8 cm.) using a commercial tensile testing apparatus. The flexural modulus of elasticity is determined from the slope of the straight portion of the load-extension curve and the flexural strength is determined all as described in procedure A of ASTM method #D-790-63. The properties measured for the specimens prepared in this example are as follows:

| Bar of particle sample | Flexural strength | Flexural modulus |
|---|---|---|
| A | 8,100 p.s.i. (570 kg./cm.$^2$). | 1,520,000 p.s.i. (107,000 kg./cm.$^2$). |
| B (control) | 770 p.s.i. (54.2 kg./cm.$^2$). | 31,000 p.s.i. (2,180 kg./cm.$^2$). |

| | Tensile strength [1] | Tensile modulus [2] |
|---|---|---|
| C | 4,410 p.s.i. (311 kg./cm.$^2$). | 160,000 p.s.i. (11,300 kg./cm.$^2$). |

[1] Tensile strength is determined as described in ASTM method No. D-638-64T and is equivalent to between 0.8 and 0.9 of flexural strength value.
[2] Tensile modulus of elasticity is determined as described in ASTM method No. D-638-64T and is equivalent to between 1.1 and 1.25 times flexural modulus value.

The improved modulus and strength of the bars prepared from the particles of this invention (A) are significantly higher than those of the bars prepared from particles which do not satisfy all of the parameters of this invention.

What is claimed is:

1. Acicular particle consisting essentally of poly(1,4-benzamide) characterized by:
   (1) a length (L) of up to about 5000 microns,
   (2) a width (W) of up to about 4 microns,
   (3) a length to width ratio $(L/W)$ of greater than about 2/1,
   (4) an average orientation angle $(2\theta_p)$ as measured by electron diffraction of less than 45°, and
   (5) an angular variation $(2\alpha)$ for minimum polarized light transmittance varying throughout the particle between 5° and 20°, said poly(1,4-benzamide) having
   (6) an inherent viscosity of between about 0.8 and 1.8 as measured in a solution of 0.5 g. poly(1,4-benzamide) in 100 cc. of concentrated (95–98%) sulfuric acid at 30° C.

2. Acicular particle of claim 1 wherein said poly(1,4-benzamide) is essentially homopolymeric and has a peak height ratio below 0.86.

3. Acicular particle of claim 1 wherein said length (L) is less than 10 microns.

4. Self-supporting shaped article comprised of a plurality of acicular particles of claim 1.

5. Self-supporting shaped article consisting essentially of a plurality of acicular partciles of claim 1.

6. Molded self-supporting shaped article reinforced with a plurality of acicular particles of claim 1.

7. Process for preparing acicular particles of claim 1, comprising:
   (1) preparing a composition containing:
      (A) about 3 to 6 weight percent poly(1,4-benzamide), based on the total weight of said composition;
      (B) about 1 to 8 moles of lithium chloride for each mole of polymer; and
      (C) an amide or urea medium; and
   (2) adding a nonsolvent having a dielectric constant less than about 15 at 20° C. which is miscible in the amide or urea medium, to the composition, while stirring to precipitate the said acicular particles.

8. Process of claim 7 wherein said amide or urea medium is selected from the group consisting of N,N,N′,N′-tetramethylurea and N,N-dimethylacetamide, and said nonsolvent is selected from the group consisting of carbon tetrachloride, chloroform and benzene.

9. Process of claim 8 wherein said composition further comprises about 2 to 16 moles of N,N-dimethylformamide for each mole of polymer.

References Cited

UNITED STATES PATENTS

| | | | |
|---|---|---|---|
| 3,063,966 | 11/1962 | Kwolek et al. | 260—78 |
| 3,094,511 | 6/1963 | Hill et al. | 260—78 |
| 3,109,836 | 11/1963 | Berry | 260—78 |
| 3,203,933 | 8/1965 | Huffman et al. | 260—78 |
| 3,225,011 | 12/1965 | Preston et al. | 260—78 |
| 3,472,819 | 10/1969 | Stephens | 260—78 |
| 3,541,056 | 11/1970 | Pikl | 260—78 |

FOREIGN PATENTS

| | | | |
|---|---|---|---|
| 1,526,745 | 4/1968 | France | 260—78 |

HOWARD E. SCHAIN, Primary Examiner

U.S. Cl. X.R.

260—29.2 N, 857 R; 264—176 F, 211, 331, 349